United States Patent [19]

Carroll et al.

[11] Patent Number: 5,569,725
[45] Date of Patent: *Oct. 29, 1996

[54] N-VINYL-N-ACYL UREA RESINS

[75] Inventors: W. Eamon Carroll, Orefield; Walter L. Renz, Macungie; Andrew F. Nordquist, Whitehall; Robert K. Pinschmidt, Jr., Allentown, all of Pa.

[73] Assignee: Air Products and Chemicals, Inc., Allentown, Pa.

[ * ] Notice: The term of this patent shall not extend beyond the expiration date of Pat. No. 5,281,682.

[21] Appl. No.: 323,210

[22] Filed: Oct. 14, 1994

[51] Int. Cl.$^6$ ............ C08F 283/04; C08G 71/04
[52] U.S. Cl. ............ 525/454; 525/455; 522/90; 522/93; 522/96; 522/104; 522/107; 522/142; 522/144; 522/162; 528/75
[58] Field of Search ............ 525/454, 455; 522/90, 93, 96, 104, 107, 142, 144, 162; 528/75

[56] References Cited

U.S. PATENT DOCUMENTS

| | | | |
|---|---|---|---|
| 3,874,906 | 4/1975 | Prucnal et al. | 117/93.31 |
| 4,129,709 | 12/1978 | Lorenz et al. | 526/264 |
| 4,205,139 | 5/1980 | Berzynski et al. | 525/38 |
| 4,348,427 | 9/1982 | Priola et al. | 427/44 |
| 4,424,314 | 1/1984 | Berzynski et al. | 525/454 |
| 4,751,273 | 6/1988 | Lapin et al. | 525/455 |
| 5,281,682 | 1/1994 | Cornforth et al. | 526/273 |

OTHER PUBLICATIONS

P. Kuntz and H Disselnkotter, Liebigs. Ann. chem., 764, 69–93 (1972).

*Primary Examiner*—W. Robinson H. Clark
*Attorney, Agent, or Firm*—Mark L. Rodgers; William F. Marsh

[57] ABSTRACT

A class of unsaturated resins which are suitable for use in radiation curable coatings has been developed. The resins comprise N-vinyl-N-acyl oligomers made by reacting a secondary N-vinylamide with a polyisocyanate monomer which is reacted with at least one mono- or polyhydric alcohol to form a urethane linkage.

17 Claims, No Drawings

N-VINYL-N-ACYL UREA RESINS

TECHNICAL FIELD OF THE INVENTION

The present invention relates to N-vinylamide terminated resins which are useful as components of radiation curable coatings.

BACKGROUND OF THE INVENTION

Acrylic-functional resins are widely employed in radiation curing as the principal film-forming materials due to their high cure rate and favorable combination of weathering, chemical resistance and mechanical properties. These resins usually range in molecular weight from about 500 to about 6,000 and encompass several distinct classes including the epoxy acrylates, urethane acrylates, polyester acrylates, and others.

Pruncal, et al., U.S. Pat. No. 3,874,906 teach a method of applying and curing a polyester-acrylate containing coating composition comprising adding N-vinylpyrrolidone to the composition and subsequently applying the composition to a substrate and subjecting it to actinic light to cure. Lorenz, et al., U.S. Pat. No. 4,129,709 disclose a coating composition comprising an oligomer produced by reacting polytetrahydrofuran with a diisocyanate, N-vinyl- 2-pyrrolidone and an acrylic acid ester having a boiling point of a least 200° C. at 760 mm Hg.

Priola. et al., U.S. Pat. No. 4,348,427 teach a method of coating surfaces by applying to the surface to be coated, a mixture composed of at least one compound from the following classes: epoxy-acrylate resins, polyester alpha, omega-acrylate resins, unsaturated polyester resins, or urethane-acrylate resins; plus at least one unsaturated compound of the amide, lactam, piperidone or urea classes, and subsequently irradiating the coated surface with radiation in the range of 200 to 400 nm.

In recent years concerns have increased about the toxicity or carcinogenic potential of the acrylic materials used in radcure systems, particularly those of low molecular weight. 2-Hydroxyethyl acrylate, which may be present as a residual in the urethane acrylates described above, is highly toxic by skin absorption and inhalation, making it undesirable as the source of unsaturation. Such concerns have stimulated interest in so-called "Non-Acrylate" radcure chemistries. So far, however, these systems have generally failed to match the cost/performance properties of acrylates.

Vinyl ether terminated resins have been suggested as alternatives to acrylated materials in that they have the advantages of lower toxicity and the ability to cure by both cationic and free radical mechanisms. Urethane versions are produced by reaction of a hydroxy vinyl ether and an isocyanate prepolymer in a method analogous to the urethane acrylates. Lapin, et al., U.S. Pat. No. 4,751,273 disclose vinyl ether terminated urethane resins prepared by reacting the product obtained by the addition of acetylene to an organic polyol with an isocyanate-containing compound at temperatures ranging from about ambient to 125° C. However, such vinyl ether resins suffer from the disadvantages of high cost and inhibition of cure by atmospheric moisture or Lewis bases when polymerized cationically.

Free radical curing of vinyl ethers with acrylates or maleates has also been described, however, these systems require careful control of vinyl ether/acrylate or vinyl ether/maleate stoichiometry due to the particular reactivity ratios of the components. They may also suffer from inferior cure speed, high color, and higher viscosities than all-acrylate systems.

Barzynski, et al., in U.S. Pat. Nos. 4,205,139 and 4,424,314 disclose curable coating compositions which contain one or more olefinically unsaturated compounds with a molecular weight from 70 to 2,000 and one or more different compounds which are copolymerizable with the above compound. The second compound has a molecular weight from 110 to 2,000 and has at least 2 N-vinyl groups and at least one carbonyl group bonded to the nitrogen of at least one N-vinyl group.

P. Kuntz and H. Disselnkotter, Liebigs Ann. chem., 764, 69–93 (1972) report the synthesis and reactions of a number of vinyl amides, including N-vinylformamide (NVF). They teach that addition to isocyanates was successful only with NVF to yield N'-substituted N-vinyl-N-formylurea.

SUMMARY OF THE INVENTION

The present invention is a class of unsaturated resins which are suitable for use in radiation curable coatings. The resins are made by reacting a secondary N-vinylamide, such as N-vinylformamide (NVF), with a polyisocyanate monomer that was previously or is subsequently reacted with at least one mono-or polyhydric alcohol to form a urethane linkage.

In the present invention, unsaturation is introduced into a urethane resin by the secondary N-vinylamide. The resultant N-vinyl-N-acyl oligomers undergo rapid free radical photopolymerization with acrylate esters to produce cured films that exhibit good physical properties. As such, they can be successfully employed in radcure systems as substitutes for acrylated urethanes. Additionally, these N-vinyl-N-acyl ureas have potential as components of totally acrylate-free systems since they exhibit rapid cure with both N-vinyl monomers and maleates. Beyond radiation-curing, the compositions have utility as modifying resins in conventional polymerizations or as, for example, resins in heat or peroxide-cured coatings.

DETAILED DESCRIPTION OF THE INVENTION

A class of unsaturated resins which can be successfully employed in radcure systems as substitutes for acrylated urethanes has been developed. The resins are made by reacting a secondary N-vinylamide with a polyisocyanate monomer that was previously or is subsequently reacted with at least one mono- or polyhydric alcohol or amine to form a urethane or urea linkage. Unsaturation is introduced into these urethane resins by the secondary N-vinylamide. The resultant resins, comprising N-vinyl-N-acyl oligomers undergo rapid free radical photopolymerization with acrylate ester monomers to produce cured films which exhibit good physical properties, making them useful in radcure systems. Additionally, these N-vinyl-N-acyl oligomers have potential as components of totally acrylate-free systems since they exhibit rapid cure with both N-vinyl monomers and maleates.

The resin of the present invention can be represented by the general structural formula (I):

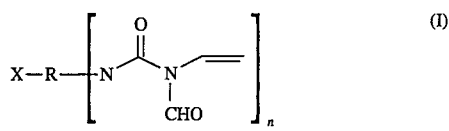

wherein n is from 1 to 5; R is a substituent selected from the group consisting of alkyl, aralkyl, cycloalkyl, oligoalkylene oxide, oligo-ester, oligo-lactone, polyacrylic ester, and mixtures thereof; and X is a reactive group selected from the group consisting of NCO, NCONVF, vinylurea, (meth)acryloxy, (meth)acrylamino, $NH_2$, OH and mixtures thereof.

Preparation of N-Vinyl-N-Acyl Urea Resins

In the preferred method of preparation, a diisocyanate having significantly different reactivity between the two isocyanate groups is reacted with a secondary N-vinylamide to form an adduct containing one vinyl group and one isocyanate group. NVF is the preferred secondary N-vinylamide but other possibilities may include N-vinylacetamide, N-vinylpropionamide, N-vinylbutyramide, and N-vinylbenzamide.

Suitable diisocyanates include aromatic, aliphatic, and mixed aromatic/aliphatic isocyanates in which the NCO groups may or may not exhibit differential reactivity. Examples include: isophorone diisocyanate, toluene diisocyanate, hexamethylene diisocyanate, phenylene diisocyanate, diphenylmethane 4,4'-diisocyanate, 4,4'-diisocyanato cyclohexyl phenyl methane, and the like. Aliphatic diisocyanates are preferred because of the superior stability of the N-vinyl-N-acyl adduct. Aromatic isocyanates are less desirable because of a greater tendency to form biuret and allophanate oligomers which are theorized to result from excessive decomposition of the adduct back to the isocyanate starting materials followed by reaction of these isocyanates with available carbamate and urea groups.

It is further anticipated that isocyanates having a functionality greater than 2 may be employed. Examples include the isocyanurates, biurets, and adducts of the above diisocyanates that provide an average NCO functionality of 3 or more. Appropriate adjustment of the vinylamide/isocyanate stoichiometry may be employed to produce adducts (and resins) with higher N-vinyl functionality.

Although some catalyst is required with aliphatic isocyanates, minimal catalyst is typically preferred since the catalyst also promotes biuret formation. No catalyst is required with aromatic isocyanates. Generally, the catalyst concentration should be in the range from about 0.0 to 0.5 mole % based on diisocyanate, with a range from about 0.0 to 0.1 mole % being preferred. Suitable catalysts include zinc salts such as zinc ethylhexonate and tertiary amines. The reaction can be run at a wide range of temperatures; i.e. from about −10° to 150° C. with a range from 10° to 80° C. being preferred. The upper temperature limit is determined by the stability of the vinylamide employed; for example, NVF should not be heated above 100° C. for more than one hour.

The secondary N-vinylamide/diisocyanate molar ratio can typically be from about 0.2 to 10 with from 0.5 to 2.0 being preferred.

The resultant adduct containing one vinyl group and one isocyanate group is then reacted with an alcohol or polyol to form a urethane linkage. The alcohol or polyol can be monomeric or polymeric in nature, and may have a hydroxy functionality of from 1 to 6, with the preferred functionality being 2 or 3. Examples of suitable monomeric polyols include: ethylene glycol, 1,4-butanediol, 1,6-hexanediol, triethylene glycol, tripropylene glycol, neopentyl glycol, glycerol, trimethylol propane, and pentaerythritol. Examples of suitable polymeric polyols include ethoxylated and propoxylated versions of the monomeric alcohols as well as any of the commercially available polyols normally used in the production of urethane resins and, in particular, acrylated urethanes for radiation curable oligomers. These typically have molecular weights between 400 and 8,000 and include: polyethylene glycol, polytetramethylene glycol, polypropylene glycol, polyester polyols, polycaprolactone polyols, and hydroxyl containing polyacrylic resins. Di, tri and polyamines and aminealcohols, preferably where the amine has one active hydrogen, can also be used giving urea derivatives. Examples include bis(dialkyl maleate) Michael adducts with hexamethylenediamine.

For the case of difunctional alcohols, the molar ratio of N-vinyl-N-acyl adduct to alcohol can be from 2 to 10 with a preferred molar ratio being from 2 to 3. The lower limit is set by the need to react at least one hydroxyl group per alcohol, since any unvinylated alcohol would not be bonded to the matrix during subsequent photopolymerization of the resins. This could weaken cured films resulting in a deterioration of properties. Excess vinyl/isocyanate adduct will add to the urea nitrogen forming a biuret, or will add to the carbamate nitrogen of the urethane forming an allophanate.

While the above method is currently the preferred synthesis technique, other methods are suitable for forming these N-vinyl-N-acyl ureas, such as reacting the vinylamide monomer with an isocyanate-terminated urethane prepolymer. For example, a urethane prepolymer is first prepared by reacting two moles of a diisocyanate monomer with a difunctional polyol to produce a resin having two terminal isocyanate groups in a manner well known to those skilled in the art. The vinylamide is then reacted with the remaining isocyanate groups of the prepolymer to yield the composition of this invention.

Optionally, removal of heavy byproducts in the N-vinyl-N-acyl urea may be achieved by dissolving the resin in a solvent such as toluene. The heavier ureas are insoluble, and the decanted solution of product can be concentrated by vacuum flashing of the solvent.

The following examples are presented to better illustrate the present invention and are not meant to be limiting.

Experimental.

A resin having the general structural formula (I) above was made in accordance with the above synthesis techniques by reacting NVF with isophorone diisocyanate and subsequently reacting with polyethylene glycol. The material obtained was a liquid resin having a molecular weight of approximately 1,200 and a complex viscosity of 230,000 cps at 25° C. This material, designated "Oligomer A" had the structural formula:

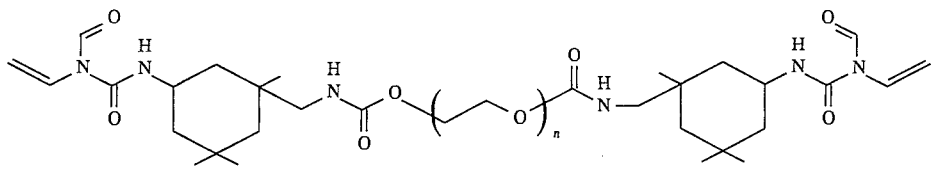

Where n is ~13.6.

A second resin was prepared in accordance with the above synthesis techniques by reacting NVF with toluene diisocyanate, followed by reaction with poly(tetramethylene glycol).

Applications Testing of Oligomer A.

Oligomer A was incorporated into a series of coating formulations that were cured by exposure to ultra-violet light. Cure rate and cured film properties were measured and compared with commercial acrylic- and vinyl ether-terminated urethane oligomers.

In the following examples, Oligomer A was mixed with a commercial free-radical photoinitiator and, optionally, other unsaturated compounds and additives. The formulations were drawn down onto aluminum or glass panels and exposed to UV light using a Fusion Systems Corp. laboratory conveyor equipped with one 300 watt per inch mercury vapor lamp. Cure response was noted by visual inspection of thin films (<1 mil, #10 wire bar) cast onto aluminum followed by measurement of pencil hardness and solvent (MEK) resistance. Free films (3–4 mils) were obtained by casting formulations onto glass panels and peeling them away after cure. Free films prepared in this manner were evaluated for mechanical properties.

EXAMPLE 1

Curing of Oligomer A alone.

Photocure of neat Oligomer A was demonstrated by compounding the resin with 5 phr Darocur 1173 photoinitiator (Ciba-Geigy) and 1 phr Fluorad FC-430 wetting agent (3M Company). Thin (~0.5 mil) films on aluminum were cured to a dry, tack-free surface at 105 fpm. Results after 4 passes were:

Pencil hardness: less than 3B

MEK resistance (# double rubs): 14

Free films were produced by curing at a belt speed of 30 fpm. Oligomer A cured to a dry film after one pass. Mechanical properties after 1 and 3 passes were as follows:

|  | 1 Pass | 3 Passes |
|---|---|---|
| Tensile strength @ break (psi) | 800 | 900 |
| % Elongation @ break | 69% | 73% |
| Tensile modulus (psi) | 1,900 | 2,400 |

EXAMPLE 2

Acrylate-Containing Formulations.

Oligomer A was next incorporated into two typical radcure formulations containing multifunctional acrylate monomers added to enhance crosslink density and lower working viscosity. For reference, a formulation based on a commercial urethane acrylate oligomer (Ebecryl 230 from UCB Radcure, Inc.) and one containing a vinyl ether-terminated urethane (Vectomer 2020 from AlliedSignal) were also tested. N-vinylformamide monomer was added to all the formulations as a reactive diluent.

Composition of the test formulations was as follows:

|  | A | B | C | D |
|---|---|---|---|---|
|  | weight percent | | | |
| Oligomer A | 70% | — | — | 50% |
| VE/Urethane Oligomer | — | 70% | — | — |
| Acrylic/Urethane Oligomer | — | — | 70% | — |
| TRPGDA | 20% | 20% | 20% | 20% |
| TMPTA | — | — | — | 10% |
| N-vinylformamide | 10% | 10% | 10% | 20% |
|  | based on total wt. of resin above | | | |
| Darocur 1173 photoinitiator | 5 phr | 5 phr | 5 phr | — |
| Irgacure 184 photoinitiator | — | — | — | 2 phr |
| Fluorad FC-430 | 1 phr | 1 phr | 1 phr | 1 phr |

TRPGDA - Tripropylene Glycol Diacrylate (Sartomer SR-306)
TMPTA - Trimethylol Propane Triacrylate (Sartomer SR-351)
Darocur 1173- 2-Hydroxy-2-methyl-1-phenyl-propan-1-one(Ciba-Geigy)
Irgacure 184 - 1-Hydroxycyclohexyl phenyl ketone (Ciba-Geigy)

Cure response was assessed visually by probing the irradiated films with a cotton swab after exposures at 105 fpm. Films exhibiting no tackiness (evidence of incomplete cure) were measured for surface hardness using the Persoz pendulum hardness method:

|  | Pendulum hardness (seconds) | | | |
|---|---|---|---|---|
|  | A | B | C | D |
| # Passes @ 105 fpm | | | | |
| 2 | 24 | (tacky) | 35 | 41 |
| 3 | 27 | (tacky) | 35 | 47 |
| 4 | 29 | 20 | 36 | 47 |

Pencil hardness and MEK resistance of the cured films after 4 passes were:

| 4 Passes @ 105 fpm | | | | |
|---|---|---|---|---|
| Pencil hardness | F | <3B | HB | <3B |
| MEK resist. (# dbl rubs) | >200 | 12 | >200 | >200 |

The data indicates that the two Oligomer A formulations (A and D) showed a high rate of cure that compares favorably with the commercial urethane acrylate C. As expected, the vinyl ether oligomer (B) exhibited a slower cure rate in free radical polymerization with acrylates.

Free films were prepared for mechanical testing using a #50 wire bar and curing at fpm (one pass). Formulation B would not produce viable films under these conditions and mechanical testing was not possible:

| 1 Pass @ 30 fpm | A | B | C | D |
|---|---|---|---|---|
| Tensile strength @ break (psi) | 1,500 | — | 1,100 | 3,000 |
| % Elongation @ break | 120% | — | 190% | 42% |
| Tensile modulus (psi) | 8,700 | — | 2,700 | 42,000 |

Example 3

Non-Acrylate Radcure Systems.

The feasibility of employing Oligomer A in totally acrylate-free radcure formulations was also examined. Photocopolymerization with an N-vinyl monomer (Formulation E), vinyl ether (F) and maleate ester diluents (H and I) was attempted. An all-vinyl ether formulation (G) was run for comparison:

|  | E | F | G | H | I |
|---|---|---|---|---|---|
|  | weight percent | | | | |
| Oligomer A | 70% | 70% | — | 43% | 51% |
| VE/Urethane Oligomer | — | — | 70% | — | — |
| N-vinylformamide | 30% | — | — | 26% | 10% |
| TEGDVE | — | 30% | 30% | — | — |
| Diethyl maleate | — | — | — | 32% | 39% |
|  | based on total wt. of resin above | | | | |
| Darocur 1173 photoinitiator | 5 phr | 5 phr | 5 phr | 5 phr | 5 phr |
| Fluorad FC-430 | 1 phr | 1 phr | 1 phr | 1 phr | 1 phr |

TEGDVE - Triethylene Glycol Divinyl Ether (ISP DVE-3)

It is known that N-vinyl compounds have a tendency to form alternating copolymers with maleate esters. For this reason, H and I employ two different N-vinyl/maleate stoichiometries, approximately 0.7:0.3 and 1:1 respectively.

All the formulations exhibited somewhat slower cure than the acrylate-containing systems. Formulations E, H and I cured to dry films, and pendulum hardness was measured after 10 passes. F formed only soft films of poor quality. The all-vinyl ether system G did not cure under these conditions:

|  | Pendulum hardness (seconds) | | | | |
|---|---|---|---|---|---|
|  | E | F | G | H | I |
| # Passes @ 105 fpm | | | | | |
| 2 | tacky | tacky | liquid | tacky | tacky |
| 5 | sl. tacky | sl. tacky | liquid | sl. tacky | sl. tacky |
| 10 | 20 | v. soft | greasy liq. | 30 | 32 |
| 10 Passes @ 105 fpm | | | | | |
| Pencil hardness | H | <3B | — | <3B | <3B |
| MEK resist. (# dbl rubs) | >200 | 23 | — | 25 | >200 |

Free films of E, H and I were prepared by curing at 30 fpm. F and G would not produce acceptable films under these conditions:

| 3 Passes @ 30 fpm | E | F | G | H | I |
|---|---|---|---|---|---|
| Tensile strength @ break (psi) | 860 | — | — | 2,100 | 1,500 |
| Elongation @ break | 32% | — | — | 380% | 360% |
| Tensile modulus (psi) | 11,300 | — | — | 16,100 | 1,100 |

The cure response data set out in the above examples indicates that N-vinyl-N-acyl urea oligomers will undergo rapid free radical photopolymerization with acrylate esters to produce cured films that exhibit good physical properties. As such, they can be successfully employed in radcure systems as substitutes for acrylated urethanes. Radcure formulations are commonly employed as printing inks, paper coatings and adhesives where the potential for human exposure via skin contact and inhalation is comparatively high. The N-vinylamide monomers used as raw materials for these compositions, and which may be present in the compositions as a residual, are less acutely toxic and pose a reduced hazard to users of these systems than residual hydroxyalkyl acrylates (notably 2-hydroxyethyl acrylate) which can be present in acrylated urethanes. Moreover, N-vinyl-N-acyl ureas have potential as components of totally acrylate-free systems since they show reasonably fast cure with both N-vinyl monomers and maleates. Other types of unsaturated urethanes (vinyl ether and maleate) have been proposed for both free radical and cationic cured systems. Materials of the present invention are intended in the former. The chief difficulty with maleates and vinyl ethers is that, unlike acrylates, they generally homopolymerize slowly via free radical mechanisms, leading to radcure systems that exhibit sluggish cure response (as in Formulation G). Faster cure (polymerization) rates are attainable by combining maleate esters with vinyl ethers, or vinyl ethers with acrylates, but these systems require careful control of the stoichiometry in order to maintain cure speed, owing to the particular reactivity ratios of these pairs. This requirement to control stoichiometry is an important constraint on these systems which limits formulation latitude and the range of film properties that can be achieved.

In the present invention, the N-vinyl moiety is employed as the source of unsaturation. In contrast to the above, N-vinyl compounds homopolymerize well by free radical mechanisms, making it feasible to employ them as the sole type of unsaturation in a radcure system. Even faster cure rates—competitive with the state-of-the-art—are attainable by combining N-vinyl compounds with polyfunctional acrylate monomers. Moreover, N-vinyl compounds copolymerize well with acrylates in broad proportions owing to the more closely matched reactivity ratios of this pair. The application test results above confirm this expectation. As a result, N-vinyl-N-acyl ureas should also have the advantage of significantly wider formulation limits (and attainable film properties) without a serious deterioration in cure speed.

Having thus described the present invention, what is now deemed appropriate for Letters Patent is set out in the following appended claims.

We claim:

1. An N-vinyl-N-acyl urea resin formed by reacting a secondary N-vinylamide with a polyisocyanate monomer that was previously or is subsequently reacted with at least one mono- or polyhydric alcohol to form a urethane linkage.

2. The resin of claim 1 represented by the structural formula:

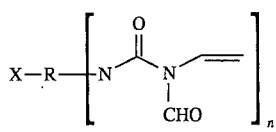

wherein n is from 1 to 5; R is a substituent selected from the group consisting of alkyl, aralkyl, cycloalkyl, oligoalkylene oxide, oligo-ester, oligo-lactone, polyacrylic ester, and mixtures thereof; and X is a reactive group selected from the group consisting of NCO, NCONVF, vinylurea, (meth)acryloxy, (meth)acrylamino, $NH_2$, OH and mixtures thereof.

3. The resin of claim 1 wherein said N-vinylamide is N-vinylformamide and said polyisocyanate monomer is a diisocyanate.

4. The resin of claim 3 wherein said diisocyanate is an aliphatic diisocyanate.

5. The resin of claim 3 wherein said diisocyanate is isophorone diisocyanate.

6. The resin of claim 1 wherein said alcohol is a monomeric polyol.

7. The resin of claim 1 wherein said alcohol is a polymeric polyol.

8. The resin of claim 1 wherein said alcohol has a hydroxy functionality of 2 or 3.

9. The resin of claim 1 formed by carrying out said reaction in the presence of a catalyst.

10. The resin of claim 9 wherein said catalyst is a zinc salt or a tertiary amine.

11. A radiation curable coating composition comprising a free-radical photoinitiator and the N-vinyl-N-acyl urea resin of claim 1.

12. The radiation curable coating composition of claim 11 which also contains one or more multi-functional acrylate monomers.

13. The radiation curable coating composition of claim 12 which contains tripropylene glycol diacrylate or trimethylol propane triacrylate as the multifunctional acrylate monomer.

14. The radiation curable coating composition of claim 11 which also contains a maleate ester or polymaleate oligomer.

15. The radiation curable coating composition of claim 14 which contains diethylmaleate.

16. An N-vinyl-N-acyl urea resin formed by reacting a secondary N-vinylamide with a polyisocyanate monomer which is reacted with at least one mono-or polyhydric amine to form a urea linkage.

17. The resin of claim 16 wherein said N-vinylamide is N-vinylformamide.

* * * * *